US010445474B2

(12) United States Patent
Tornielli et al.

(10) Patent No.: US 10,445,474 B2
(45) Date of Patent: Oct. 15, 2019

(54) CONTROLLING DELIVERY OF ENCRYPTED MEDIA ASSETS

(71) Applicant: PIKSEL, INC., Wilmington, DE (US)

(72) Inventors: Giorgio Tornielli, Mortara (IT); Stefano Valsecchi, Monza (IT)

(73) Assignee: PIKSEL, INC., Wilmington, DE (US)

( * ) Notice: Subject to any disclaimer, the term of this patent is extended or adjusted under 35 U.S.C. 154(b) by 62 days.

(21) Appl. No.: 15/326,187

(22) PCT Filed: Jul. 15, 2015

(86) PCT No.: PCT/EP2015/066149
§ 371 (c)(1),
(2) Date: Jan. 13, 2017

(87) PCT Pub. No.: WO2016/008918
PCT Pub. Date: Jan. 21, 2016

(65) Prior Publication Data
US 2017/0206340 A1 Jul. 20, 2017

(30) Foreign Application Priority Data

Jul. 15, 2014 (GB) .................................. 1412559.5

(51) Int. Cl.
*G06F 21/10* (2013.01)
*H04L 9/14* (2006.01)
(Continued)

(52) U.S. Cl.
CPC ................ *G06F 21/10* (2013.01); *H04L 9/14* (2013.01); *H04L 9/30* (2013.01); *H04L 63/061* (2013.01);
(Continued)

(58) Field of Classification Search
CPC ... G06F 21/10; H04L 9/14; H04L 9/30; H04L 63/061
See application file for complete search history.

(56) References Cited

U.S. PATENT DOCUMENTS

| 8,751,800 | B1 | 6/2014 | Dorwin | |
| 2004/0003139 | A1* | 1/2004 | Cottrille | .............. H04L 63/0823 |
| | | | | 719/331 |

(Continued)

OTHER PUBLICATIONS

Livshits, "Towards Security of Native DRM Execution in HTML5", 2015, IEEE International Symbosium on Multimedia, pp. 411-416 Year: (2015).*

(Continued)

*Primary Examiner* — Taghi T Arani
*Assistant Examiner* — Gregory A Lane
(74) *Attorney, Agent, or Firm* — Holzer Patel Drennan

(57) ABSTRACT

The invention relates to a computer guard system for controlling delivery of encrypted media assets in a service which governs the delivery of a set of media assets to a group of authorized users comprising: an administrator interface configured to receive configuration data from an administrator to define at least one environment defining how media assets in that service are to be delivered to authorized users, wherein the configuration data defines, for each environment, (a) multiple DRM technologies for decrypting the same asset at multiple end user platforms, each DRM technology being associated with its own set of default license properties; (b) at least one software plug-in to be instantiated to perform a verification method to verify if an end user request for delivery of an asset is valid; a store for holding defined environments with respective environment identifiers; a key server module having an interface connectable to an encryption module and configured to: exchange (i) an asset identifier, which identifies an asset to be encrypted, (ii) a secret key for use in encrypting the asset, and (iii) a key identifier which is to be located in the encrypted asset and which identifies the secret key; execute a set of rules to compare a characteristic associated with the asset with multiple environments to associate at least one (Continued)

environment with the asset wherein the characteristic represents the service for which the asset is provided; and store an association between the asset and at least one determined environment, whereby multiple assets for the same service intended for delivery on different end users platforms are associated with a single environment, and wherein the configuration data for each environment identifies the default license properties and software plug-in to be applied to the asset, in dependence on the DRM technology used at the end user platform to enable the computer system to automatically respond to end user requests to play out an asset.

19 Claims, 12 Drawing Sheets

(51) Int. Cl.
*H04L 9/30* (2006.01)
*H04L 29/06* (2006.01)
*H04N 21/266* (2011.01)

(52) U.S. Cl.
CPC ............... *H04N 21/26606* (2013.01); *G06F 2221/0759* (2013.01); *G06F 2221/0773* (2013.01); *H04L 2209/603* (2013.01)

(56) References Cited

U.S. PATENT DOCUMENTS

| | | |
|---|---|---|
| 2004/0162846 A1 | 8/2004 | Nakahara |
| 2005/0027871 A1 | 2/2005 | Bradley |
| 2008/0098481 A1 | 4/2008 | Lee |
| 2015/0026452 A1* | 1/2015 | Roelse ............... H04L 63/0428 713/150 |

OTHER PUBLICATIONS

International Search Report and Written Opinion, dated Oct. 7, 2015, WIPO.

* cited by examiner

CONTROLLING DELIVERY OF ENCRYPTED MEDIA ASSETS

The present invention relates to controlling delivery of encrypted media assets.

Infrastructure for delivering media assets to end users comprises a store for media assets. The store can comprise video servers or other data storage mechanisms. Media assets can be delivered directly from a server, or via a content delivery network (CDN) to end users. End users who wish to consume the assets have end user devices in the form of computer devices. Nowadays these end user devices can take a number of different forms, for example, personal computers (PC), mobile devices such as phones, tablets and laptops, games consoles, etc. In order for an end user device to consume a DRM encrypted media asset, it is installed with a DRM (Digital Rights Management) client, which is a computer program operating according to a particular DRM technology and includes a video player for decrypting the encrypted asset and playing it out to an end user at their device. Different end user devices may use different DRM technologies and therefore have different encryption/decryption requirements.

Another challenge facing the delivery of media assets in this kind of infrastructure is the fact that it is necessary to determine license permissions before an asset is played out at an end user device. That is, properties which are associated to particular DRM licenses need to be known for each asset. Licenses can be a persistent license or a non-persistent license. Output protection properties to include in the license can vary, and in the case of a persistent license it is necessary to know how long the release license is valid for.

Moreover, it is sometimes necessary to have in place a mechanism to verify if a particular user requesting a license for watching a particular asset is actually entitled to watch that content.

In the present infrastructure, when a user requests an asset, a license request is passed from the end user device to a guard system which can evaluate the license request and return a response to deal with the above requirements.

This is not straight forward, because account needs to be taken of different licensing properties and different DRM technologies.

SUMMARY

According to an aspect of the present invention, there is provided a computer guard system for controlling delivery of encrypted media assets in a service which governs the delivery of a set of media assets to a group of authorised users comprising: an administrator interface configured to receive configuration data from an administrator to define at least one environment defining how media assets in that service are to be delivered to authorised users, wherein the configuration data defines, for each environment, (a) multiple DRM technologies for decrypting the same asset at multiple end user platforms, each DRM technology being associated with its own set of default license properties; (b) at least one software plug-in to be instantiated to perform a verification method to verify if an end user request for delivery of an asset is valid; a store for holding defined environments with respective environment identifiers; a key server module having an interface connectable to an encryption module and configured to: exchange (i) an asset identifier, which identifies an asset to be encrypted, (ii) a secret key for use in encrypting the asset, and (iii) a key identifier which is to be located in the encrypted asset and which identifies the secret key; execute a set of rules to compare a characteristic associated with the asset with multiple environments to associate at least one environment with the asset wherein the characteristic represents the service for which the asset is provided; and store an association between the asset and the at least one determined environment, whereby multiple assets for the same service intended for delivery on different end users platforms are associated with a single environment, and wherein the configuration data for each environment identifies the default license properties and software plug-in to be applied to the asset, in dependence on the DRM technology used at the end user platform to enable the computer system to automatically respond to end user requests to play out an asset.

The characteristic can be defined in the asset identifier. Alternatively, the rules can be based on other criteria such as the IP address of the encryption module or based on explicit parameters that are posted by the encryption module to the key server.

The following described embodiments of the invention provide an improved infrastructure for handling multiple DRM technologies. They also address a further complication which arises in the development of so-called OTT (over-the-top) services. These services are designed to deliver assets from a number of different sources to a number of different end user platforms, all under the umbrella of a single OTT service. In delivering these services, it is desirable if encrypted assets (or part of them) can be shared so that it is not necessary to create different versions of an asset for different DRM technologies, or to duplicate assets to handle different end user platforms.

Increasingly, multiple OTT services are managed by a single service provider, who may have a set of assets that he wishes to provide in the different services that he manages. In this context, it is particularly useful if a single set of assets can be utilised without duplication or without creating multiple encrypted versions. An example of multiple OTT services managed by one service provider are the Sky Go and NOW TV services offered by BskyB in the UK, or equivalent services launched by Sky Italy and Sky Germany.

The verification method can be achieved by selecting one of a number of available predefined methods (e.g. always release the license, only release the license if a token provided together with the license request is valid), or by specifying a URL of an external service able to perform the necessary verification.

Each environment can be defined by an environment identifier, wherein the end user request includes the environment identifier for the asset which is the subject of the request. The environment identifier is managed in the same way as all the other metadata describing the assets and the OTT service. The computer guard system can comprise a component configured to access the software plug-in to be instantiated as defined by the environment, or it can include the software plug-in as part of the guard system itself. The software plug-in always returns a verification that the end user request is valid. The software plug-in can connect to a policy manager component for handling the verification method. In this form it can operate to validate a token in the license request. A token is used when a web store has already independently verified that the end user is already entitled to watch that content and hence to receive the license (this can be done when the policy manager is actually part of the web store). The set of rules can operate to associate each asset with multiple environments.

The guard system can itself include the encryption module for encrypting the asset using the secret key exchanged with the key server module, or the encryption module can be a separate component.

The encryption module can operate to encrypt the asset in accordance with the common encryption format.

The guard system can comprise at least one license server operable to receive an end user request, access an environment identified in the request and return a response based on the properties of the environment.

In another aspect, the invention provides a store which holds a set of assets encrypted according to the common encryption format, whereby each asset can be decrypted by more than one DRM technology; a component configured to deliver a selected asset to an end user terminal; and a guard system as herein defined for controlling play out of the asset at the end user terminal. The delivery system can be used to deliver over-the-top video services. The set of assets can support multiple services, each service having a group of authorised users.

Each service can be associated with a respective environment, whereby each asset is associated with each one of the respective different environments.

Alternatively, each asset in the set of assets can be associated with the same environment. There are cases where it may be necessary to have one OTT service using two environments. There can be other cases. For instance, when the OTT service is managing video on demand (VOD) assets only (but the same could apply to live channel (LC) assets) but these assets were licensed from different content producers, requiring a different set of license properties. A realistic case is when the OTT service provider has licensed assets for major studios that are very restrictive in the properties of DRM license, but at the same time it delivers assets that are products in house. For the latter, the service provider can decide to use less restrictive license properties. In this case two environments can be used.

The invention provides in a further aspect, a method of controlling delivery of encrypted media assets in a service which governs the delivery of a set of media assets to a group of authorised users comprising: receiving at an administrator interface configuration data from an administrator to define at least one environment defining how media assets in that service are to be delivered to authorised users, wherein the configuration data defines, for each environment, (a) multiple DRM technologies for decrypting the same asset at multiple end user platforms, each DRM technology being associated with its own set of default license properties; (b) at least one software plug-in to be instantiated to perform a verification method to verify if an end user request for delivery of an asset is valid; storing defined environments with respective environment identifiers; exchanging between a key server module and an encryption module (i) an asset identifier, which identifies an asset to be encrypted, (ii) a secret key for use in encrypting the asset, and (iii) a key identifier which is to be located in the encrypted asset and which identifies the secret key; executing a set of rules to compare a characteristic associated with the asset with multiple environments to associate at least one environment with the asset wherein the characteristic represents the service for which the asset is provided; and storing an association between the asset and the at least one determined environment, whereby multiple assets for the same service intended for delivery on different end users platforms are associated with a single environment, and wherein the configuration data for each environment identifies the default license properties and software plug-in to be applied to the asset, in dependence on the DRM technology used at the end user platform to enable the computer system to automatically respond to end user requests to play out an asset.

The invention also provides a computer program product for implementing the method.

According to a further aspect of the invention there is provided a license system for controlling delivery of encrypted media assets in a service which governs the delivery of a set of media assets to a group of authorised users, the license system comprising: a license server operable to receive a request from an end user and to return a response to the end user, the response controlling the delivery of a media asset identified in the end user request; a store holding multiple environments, each environment having a respective environment identifier, each environment defined by configuration data which defines: (a) multiple DRM technologies for decrypting the same asset at multiple end user platforms, each DRM technology being associated with its own set of default license properties; (b) at least one software plug-in to be instantiated to perform a verification method to verify if an end user for delivery of an asset is valid; wherein the license request includes an environment identifier and the response returned from the license server is based on the properties of the environment identified by the environment identifier in the end user request.

According to a further aspect of the invention there is provided a method of controlling delivery of encrypted media assets in a service which governs the delivery of a set of media assets to a group of authorised users, the method comprising: receiving at a license system a request from an end user identifying a media asset and an environment; accessing the environment identified in the request from the end user; and returning a response from the license system to the end user based on the properties of the environment, wherein each environment is defined at a guard system by configuration data which defines: (a) multiple DRM technologies for decrypting the same asset at multiple end user platforms, each DRM technology being associated with its own set of default license properties; and (b) at least one software plug-in to be instantiated to perform a verification method to verify if an end user request for delivery of an asset is valid; wherein the method comprises, after accessing the environment, instantiating the at least one software plug-in and performing the verification method defined by the plug-in.

Embodiments of the invention described in the following description have a number of advantages. They simplify and make more reliable the workflows required for creation and management of assets. The workflow herein mentioned is a set of actions that are necessary to apply to a video asset in its "clear" form before it can be deployed to a content delivery network for delivery to end users who desire to watch that video. In this context "clear" means the unencrypted original form of an asset. Embodiments described in the present application do not require the creation of a version for each DRM technology and the same asset can be shared in multiple OTT services.

This permits a content preparation workflow to be quite simple. According to one embodiment, the content preparation workflow comprises:

ingesting the asset in clear form encoding and encrypting the asset according to a CENC [common encryption] format, and copying the asset to a content delivery network In this document, the common encryption format refers to ISO/IEC 23001-7:2012 Information Technology—MPEG systems technologies—Part 7: Common Encryption in ISO base media file format files.

At the encoding and encryption stage, an encryption module which carries out the encryption negotiates with the key server to provide encryption secrets and to associate such secrets to all of the environments that have been determined as necessary.

This avoids the need to encrypt multiple versions of the same asset. If multiple versions of the same asset would need to be encrypted, it would be necessary to have a more complex workflow with the additional risk that each single step could fail for any reason.

In addition, described embodiments of the present invention reduced storage and encryption cost. Encoding/encryption are processes that take time and therefore they have a cost associated with them. These costs are of two kinds: direct costs related to the actual computation costs needed for the encoding/encryption and an indirect cost related to lack of revenue caused by the delay in publication of assets. The latter is particularly clear in the initial preparation of a video archive or in the preparation of a complete TV series.

Storage is saved by avoiding the need to unnecessarily duplicate assets.

For a better understanding of the present invention and to show how the same may be carried into effect reference will now be made by way of example, to FIG. 1 which is a schematic diagram of architecture of a computer system for controlling delivery of media assets;

Before describing embodiments of the invention, there follows a background description of protecting digital assets with DRM.

DRM permits to distribute valuable digital assets (e.g. video, text, images, audio) in an encrypted format, such that it is virtually impossible for a malicious user to create a clean copy of that asset, thus preventing its illegal re-distribution.

In order to achieve such an objective, the digital asset is encrypted using one of the cypher algorithms known in the literature. One algorithm which is used is the Advanced Encryption Standard (AES) Advanced Encryption Standard, Federal Information Processing Standards Publication 197, FIPS-197 published by the United States National Institute of Standards and Technology (NIST). AES is a symmetric cypher, namely, a "secret key" used for encryption must be used for decrypting the same digital asset. The version of AES used for the distribution of digital assets, typically uses a secret key of 128 bits length. When a key of this length is used, the AES algorithm guarantees that trying to decrypt the encrypted asset without knowing the secret key takes too much time to be of practical use. A recently developed protection scheme is CENC (Common Encryption) which specifies standard encryption and key mapping methods that may be utilized by one or more digital rights and key management systems (DRM systems) to enable decryption of the same file using different DRM systems. In practice, it specifies that AES-128 CRT algorithm must be used for encryption and it specifies where DRM specific information must be stored in the encrypted file.

In the domain of digital video distribution, the encryption of digital assets is normally performed either by dedicated software tools or by encoders that perform the encryption at the same time of the encoding of the asset in the format required for online distribution.

Figure 1:
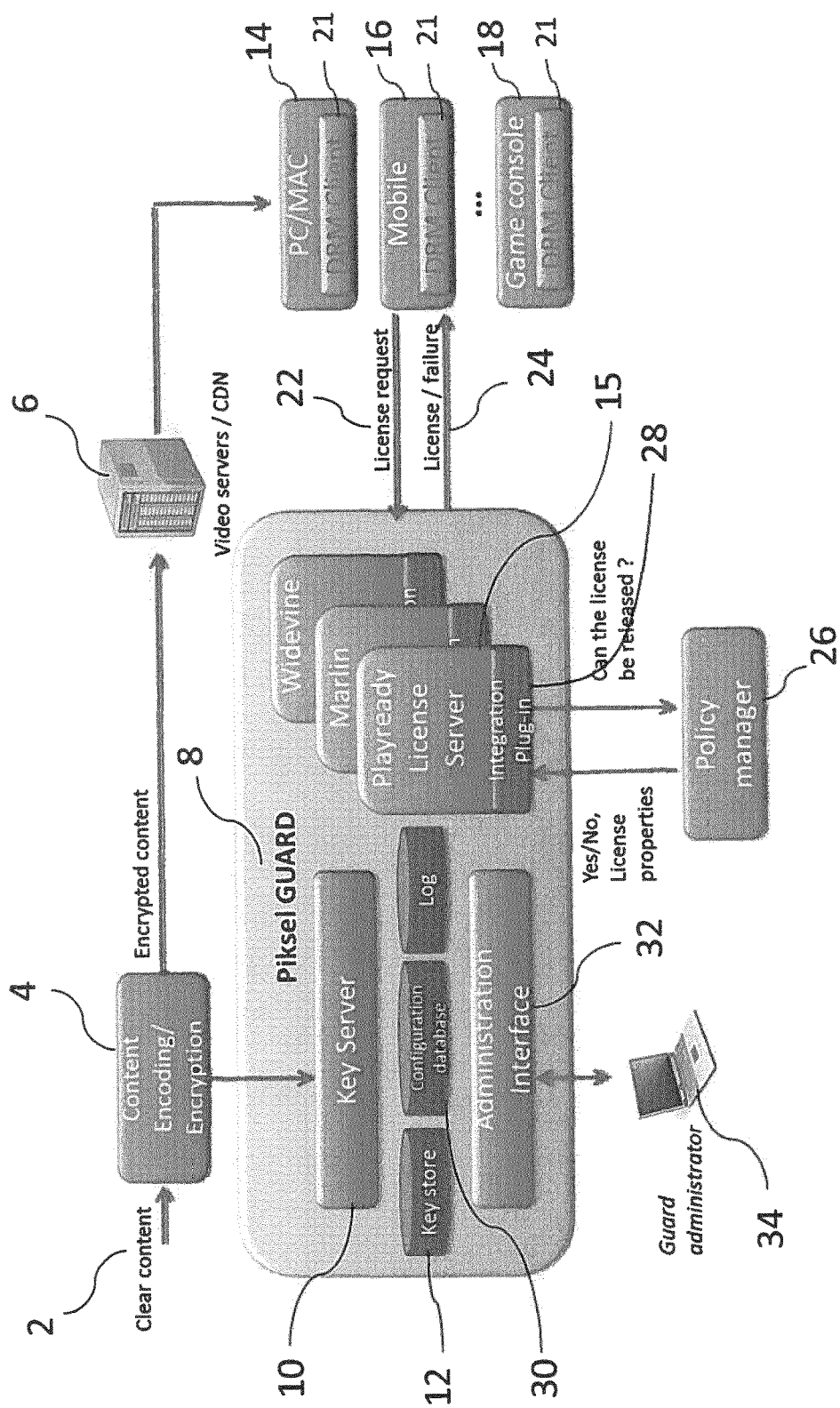
FIG. 1a is a schematic block diagram of a basic DRM solution.
Figure 1A:
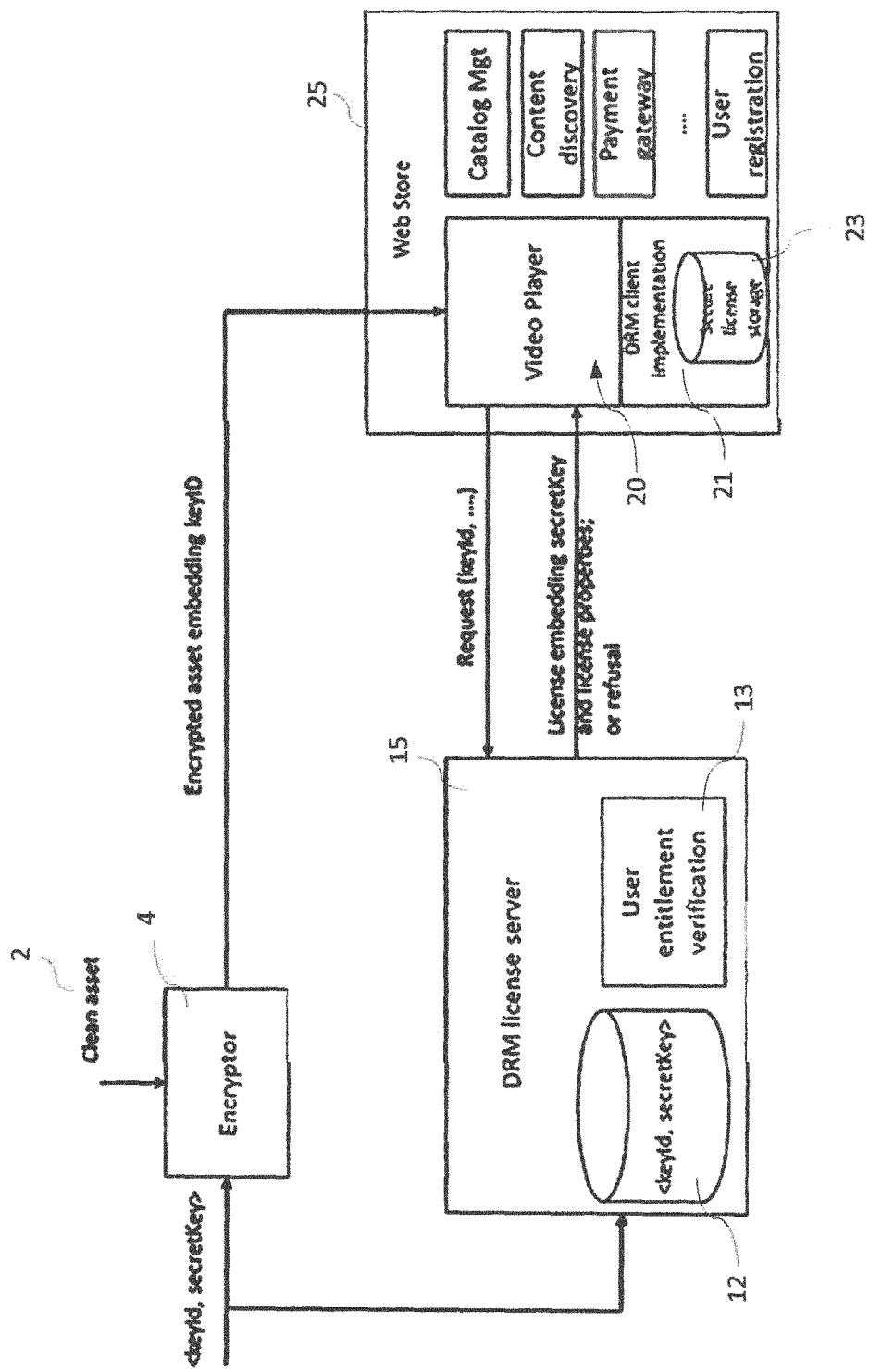

FIG. 1a shows the architecture of a DRM solution in the online video distribution domain. It consists of the following basic components:

An encryption module 4 able to apply an encryption algorithm to a clean asset 2 in order to generate an encrypted version of it. The encryption process requires the use of a secret key.

A video player 20 installed at an end user device 18 (shown in FIG. 1) to play a possibly encrypted video (the video is normally sent to the player by a streaming server 6—shown in FIG. 1). In the case the player detects that the video is encrypted, it must ask for the appropriate secret key in order to decrypt the video.

A license server 15 which is the component that is contacted by the video player 20 in order to get the secret key for decryption. The license server 15 has to maintain (or access) a store 12 of the secret keys used by the encrypter to encrypt the assets. When the license server returns the secret key to the player, the video player can start decrypting the video and show the clean asset to the end-user In DRM systems, the dialog between the video player and the license server 15 is normally based on Public Key Cryptography techniques in order to guarantee the safe and secure exchange of information between the two components.

The request issued by the video player 20 normally includes the type of device asking for a license (PC, MAC, Samsung Smart TV, iPad etc.); furthermore, OTT services may also add custom data as part of the request (for instance, an identifier of the end-user who is asking for the license).

Different DRM technologies implement different proprietary protocols in order to guarantee the security of the communication.

The information returned by the license server to the video player 20 is not just the secret key that can be used to decrypt the asset, but it is a more complex object, named "DRM license" or simply "license". A DRM license contains, in addition to the secret key, a number of properties specifying how that secret key has to be used. Examples of license properties are the following:

Persistent v.s. non-persistent license; a persistent license has a validity period (also specified in the license) and when received in the video player 20, it is stored in the player in a secure storage area. The next time the video player will try to play the same asset, it will verify if it already has a valid persistent license in its storage; if this is the case, the secret key embedded in it is used instead of requesting the license server for a new license. Non-persistent licenses are never stored in the video player.

Output protection levels; a set of parameters specifying the properties that the computer running the video player 20 has to have in order to permit video playback.

For instance, if the computer implements digital protection technologies such as HDCP. High-bandwidth Digital Content Protection (HDCP), is a form of digital copy protection introduced by Intel to prevent copying of digital audio and video content as it travels across connections. The system is meant to stop HDCP-encrypted content from being played on unauthorized devices or devices which have been modified to copy HDCP content. Specifically, in some DRM technologies it is possible to specify that a DRM protected video must not be played on devices that do not support HDCP. Similar properties can be specified for other types of protection techniques possibly available in the user's device The license may specify if the document may be copied or printed; mainly used in the case the digital asset is a text document Video player signature. In some cases the license may contain an identifier that unequivocally identifies a video player; in this case, the asset can only be played by the video player specified in the DRM license.

Different DRM technologies support different sets of license properties.

The video player 20 embeds a software module referred to as DRM client implementation 21 able to:

detect a video is encrypted decrypt the video when the secret key is available run the dialog with the corresponding license server and enforce the properties contained in DRM licenses keep the secure storage 23 for persistent licenses Each DRM technology has its own proprietary DRM client implementation.

An asset in the DRM system is identified by a pair <keyId, secretKey>. When the encrypter 4 performs the encryption, it also embeds into the encrypted asset a so called "keyId". This is a unique identifier of the secret key that has been actually used for encrypting that asset.

The identifier keyId, is used as the primary database key in the database (store) 12 used to store the secret keys and it is the identifier that is included by the video player 20 in the license request.

The video player 20 issues a request to the license server 15 for a license for the video corresponding to keyId; the license server extracts from the key store 12 the secret key corresponding to keyId and creates a license including that secretKey. The license is completed with the correct license properties and it is returned to the video player.

The license server 15 can verify if the end-user asking for a license is entitled to watch that video. The license server 15 in some cases may also refuse to return a DRM license to the video player 20. In other words, the license server 15 may perform some action by a verification module 13 in order to verify if the specific end-user who started the play action in the video player is actually entitled to watch that video.

This verification is an optional step that may not be relevant in some scenarios where DRM is used; however, this is quite common in OTT services. This verification step requires that the video player includes in the license request some information permitting to identify the end-user generating the request and the corresponding video content; for performing the verification, the license server must include (or be able to engage) a module able to verify if that user is entitled to watch that video content.

The video player forms part of a web store 25 which holds user and content information and represents the application actually implementing the complete OTT service offered by the service operator. For instance, a web store may be the SkyGo web application permitting Sky subscribers to search and watch for the content available on-line. The web store 25 consists of components that are run in the end user device and components running in the backend, providing services to the frontend components. The video player runs in the end user device. Backend components include catalogue management, content discovery, a payment gateway, user registration, etc.

The general DRM schema previously described is currently implemented by a few technology providers such as:

Microsoft with its PlayReady technology

Intertrust with Marlin technology

Adobe with Flash Access

Google with Widevine

All these technologies differ in a few main aspects:

1) the proprietary protocol between the client (video player) and the license server for the negotiation of licenses 2) the set of properties that can be specified in the licenses 3) the DRM client implementation in charge to enforce the properties specified in the licenses Other variants to the above general scheme may be implemented by the different DRM technologies.

The different DRM technology providers normally offer their DRM technologies in the form of software SDKs or in the form of executable programs or in the form of Web services such that OTT providers could integrate such DRM functions in their services. There is no standardization in the software interfaces provided by each DRM technology vendor and hence in order to implement each DRM technology it is necessary to have knowledge of the specificities of each of such components.

OTT services sometimes need to implement more than one DRM technology

In multiscreen online video distribution solutions involving a variety of devices, it may be necessary to manage multiple DRM technologies at once. This may happen, for instance, when some of the devices that must be supported implement a specific DRM technology only.

For instance, an OTT provider could select Adobe Flash as their video delivery technology of choice, and this implies the use of Flash Access DRM. However, the same OTT provider could decide to also offer the OTT service on XBOX game consoles. The latter only supports Microsoft PlayReady DRM. Therefore, that OTT provider has to implement both PlayReady and Flash Access.

Another example is the following: in Italy, but a similar situation applies to other European countries, the receivers (TV and set-top-boxes) used for receiving digital terrestrial television (DTT) have been standardized. In Italy, the current level of standardization mandates for hybrid receivers (DTT+IP) the support of Marlin DRM only. For this reason, an Italian OTT service provider targeting both PC, XBOX and DTT hybrid receivers has to support both PlayReady and Marlin.

In other cases, the choice of the DRM technology may be more opportunistic. This is the case when a device type supports more than one DRM technology, but the cost for the service provider of each DRM technology is different (e.g., some DRM technologies are basically free for service providers).

FIG. 1 is a schematic block diagram of the high level architecture of Applicant's guard software system. Reference numeral 2 denotes a clean asset (clear content). Clear content is non-encrypted video files or video streams which are input to an encoding/encryption phase implemented by the content encoding/encryption module 4. The encryption module 4 outputs encrypted content, for example, encrypted video files. The encrypted video files are normally stored in dedicated video servers which are able to stream them to end users. CDN are often used to deliver content to end users. Suitable storage/distribution of encrypted content is denoted 6 in FIG. 1. The encryption module 4 also has a connection to a guard subsystem 8. The guard subsystem 8 has a key server 10 associated with the key store 12. Encryption of clear content can be either achieved by means of software modules that are provided as part of the guard software system, or as external third party encoders. In any case, the encryption modules 4 are interfaced with the guard subsystem 8, specifically the key server module 10, for the exchange of encryption secrets (<secretKey keyId pairs) that are stored in the guard key store 12. The key server 10 is responsible for managing dialog with the encryption modules 4 for the exchange of encryption secrets (keys) and all related information. The encryption secrets are stored locally in the key store 12. As described above the encryption secrets normally consist of two parts: a secret key that must be kept hidden in the system and a key identifier keyId that unequivocally identifies the associated secret key. The key identifier is embedded in the encrypted video file together with other DRM specific information.

The guard subsystem 8 also includes the license server 15. The license server is a core component of the guard subsystem and is in charge of managing license requests which come in from video players of end users. Video players are installed and run on end user devices, three examples of which are shown in FIG. 1. FIG. 1 illustrates a PC/mac 14, a mobile device 16 and a game console 18. Each of these has a video player installed and denoted 20 including DRM client 21. They implement the client's side part of the DRM technology thus permitting the consumption of encrypted videos. When a video player determines that it has to play an encrypted asset, it starts a dialog with the license server 15 in order to obtain a DRM license permitting decryption of the content. The license request issued by the video player includes the key identifier keyId permitting to unequivocally determine the secret key necessary to decrypt the asset. Depending on the DRM technology adopted, the video player can be based on Microsoft Silverlight, Adobe Flash or other player development technology compatible with the selected DRM technologies. The interaction protocols between the DRM client 21 and the license server 15 are DRM proprietary. The license server manages the mechanics of license creation and their delivery to the video players. In FIG. 1 the license request is denoted by reference numeral 22 and the license grant or failure denoted by 24. The license server 15 normally relies on an external policy manager 26 for verifying if the given end user has the rights to watch the specific contents and hence if the license can be released or not. The license released contains the secret key permitting the video player to decrypt the asset as well as the license properties specifying, for instance, how long that video can be reviewed by the client requesting the license. Each DRM technology supports a different set of license. In the implementation described herein, each DRM technology has its own license server for dealing with the specifics of that DRM technology. In this way, the guard system can support multiple DRM technologies.

The policy manager 26 is an external component (for example, part of the web store 25 which delivers video assets), providing the business logic necessary for deciding if a given user has the rights to watch a specific content. The integration between the guard subsystem 8 and the policy manager 26 is handled by a plug-in 28 to allow easy customisation. The guard subsystem 8 provides a software development kit which permits to indicate any external policy manager. In addition, it provides a number of pre-defined plug-ins and could provide its own integrated and proprietary policy manager if needed. The guard subsystem 8 has a configuration database 30 which stores configuration details, default license properties and other information needed by the system. In addition to the licensor configuration data, the database stores logs of activity performed by the guard subsystem in terms of request received the licenses generated.

A guard administration interface 32 provides a web-based console which enables the configuration of the guard subsystem and browsing of the log information.

The MultiDRM guard software system illustrated in FIG. 1 allows multiple DRM's to be supported in a unique and coherent architecture which permits the interfaces with external policy manager modules and external encrypters to be extracted. Furthermore, it provides an easy to use administrator interface for configuring the whole system by a guard administrator 34.

Supporting multiple DRM is important as many end user devices may wish to receive video assets. It is the objective of service providers (the people who are distributing the assets) to reach as many end users as possible on as many devices as possible. Thus, even when providing a single service, such as an OTT (over-the-top) service, it may be necessary to support multiple DRM technologies in the same service.

Figure 2:
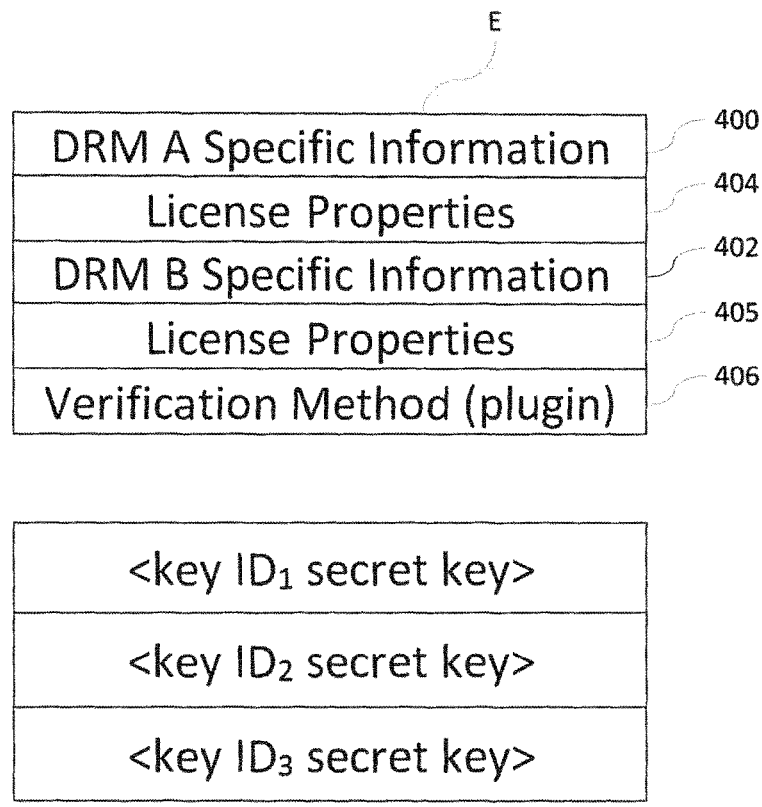
FIG. 2 is an illustrative diagram of an environment.

Guard environments are the logical entities used to segregate the configuration information specific to each DRM system. The guard administration user interface 32 permits the creation and configuration of such environments. FIG. 2 illustrates an environment defined according to an embodiment of the invention. An environment contains the following data:

Default license properties (e.g. type of license, output protection levels, etc.) that will be included in the licenses—note that the plug-ins can overwrite these default properties if needed;

Reference to the plug-ins for the integration with the policy manager that must be used Other DRM specific data The logical construct of an environment is a tuple, e.g. <DRM technology, default license properties, policy verification module, LIST (<keyId, secretKey>)>

Figure 3:
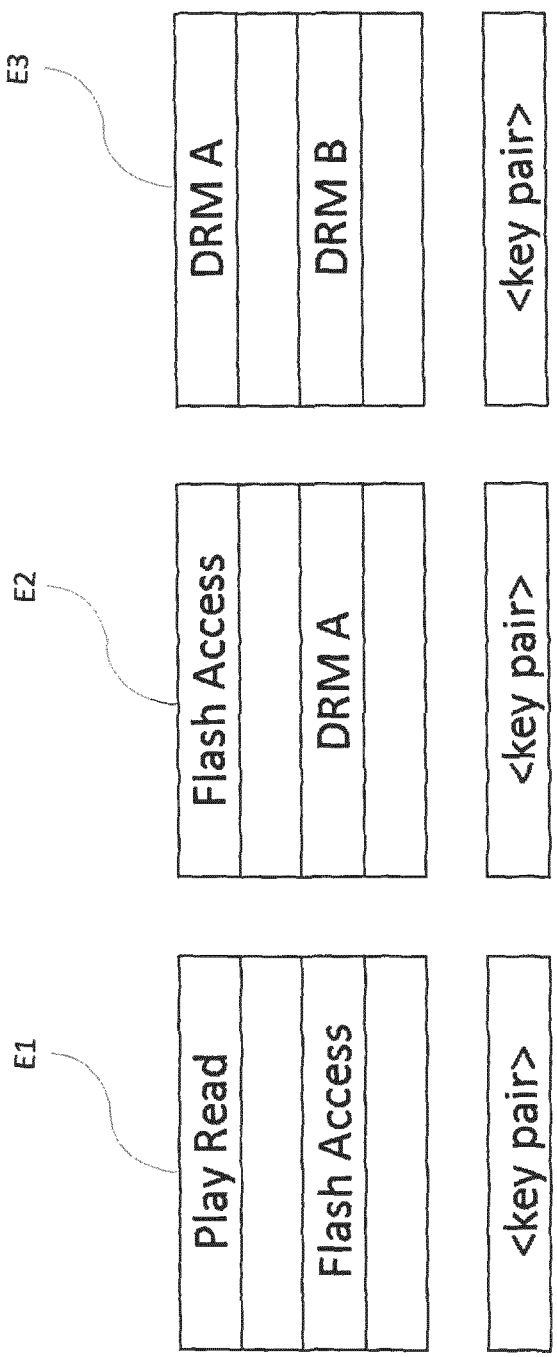
FIG. 3 is an illustrative diagram of multiple environments.

At least one environment must be created when the guard system is used in a given OTT service. FIG. 3 shows multiple environments, where E1 supports PlayReady and Flash Access, E2 is directed to Flash Access and DRM A, E3 supports DRM A and DRMB. In this context, DRM A, and DRM B are different DRM's to PlayReady and Flash Access.

Figure 4:
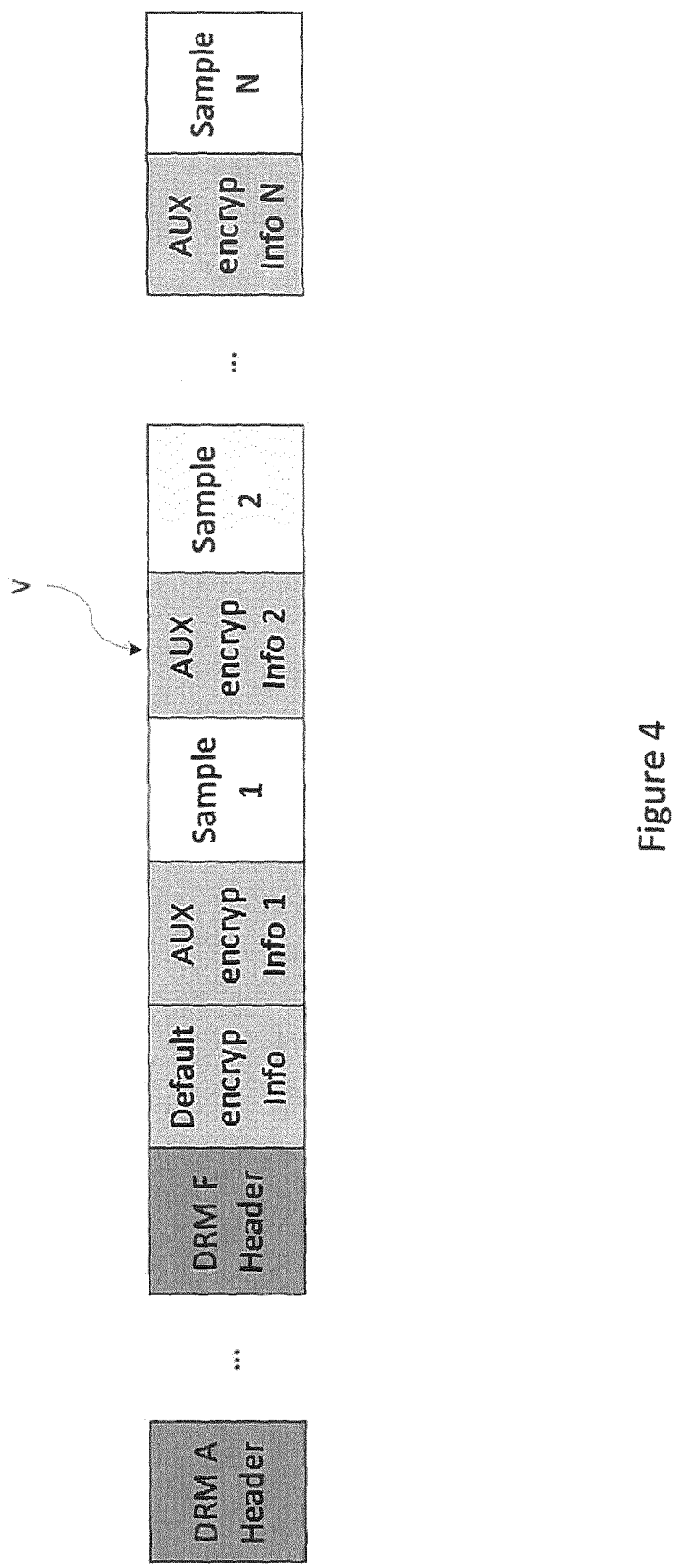
FIG. 4 is a schematic diagram of an encoded video asset.

When an asset is encrypted and its encryption secrets are stored in the key store 12, the asset is associated with at least one environment. The association between an asset and each corresponding environment is achieved by means of a number of rules based on the asset name. For example, all assets whose name starts with the string SKY have to be associated to environment E1. These rules are executed by the key server module 10 when the asset is encrypted. This video-to-environment association is necessary because when the video player asks for a license for video V1, the guard subsystem 8 extracts from the key store 12 the encryption secrets for V1 as well as the environment with which the asset V1 is associated, such that from this environment it is able to determine which default license policies to use and which programs to activate for verifying the entitlements of the user. In the past, different DRM systems could not share video assets. In other words, in the case that two DRM systems, let us say A and B, had to be used in the service, for the same asset it was necessary to create an encrypted version of it for DRMA, and a different encrypted version for DRMB. This had the drawback of the size of storage required for maintaining multiple copies of the same asset, in the complexity of the work flows necessary to create those versions in the cost of generating multiple versions of the same asset. To remove this limitation, the common encryption format CENC has been introduced. The CENC format permits to have only one encrypted file that can be interpreted by multiple DRM (assuming they know the encryption secrets). FIG. 4 illustrates a Video Asset V encrypted according to the CENC format. The asset includes encrypted samples, each associated with a key identifier appropriate to the DRM technology of the sample.

A file encoded according to the CENC schema must contain the specific information required by each DRM technology. This data is stored in header portions. Each DRM technology has its own header box (DRM A Header . . . DRM F Header, etc.).

The content of each header is opaque to CENC. A header may include data such as the URL of the license server, embedded licenses/rights, and/or other protection system specific metadata. Default encryption information such as KeyId, initialisation vector size and encryption flag are also specified. Each sample may use a different set of encryption data with respect to the default encryption information. These are specified for each sample in an auxiliary encryption data box (AUX encryp info 1, AUX encrypt info 2). CENC permits to specify auxiliary information for a group of samples and furthermore, each sample may be further split into subsamples where each subsample may use a different set of encryption data. The samples are labelled in FIG. 4, Sample 1, Sample 2, etc. Samples are independent from the specific DRM technology specified in the different headers.

Embodiments of the present invention provide an infrastructure which exploits the common encryption format.

Namely, each environment E of FIG. 2 may contain a set of DRM technologies, each with their own set of default license properties and a reference to the correct policy verification module. In addition, an environment has logically associated the list of assets that can be used in that environment, each asset defined by a key pair.

A "Guard environment" is a good abstraction for an OTT service as perceived by the end-user, even if it is not necessary to have a one-to-one association between an OTT service as perceived by the end-user and a Guard environment.

When an asset is encrypted, it can be associated to more than one environment.

License requests from the video player to the License Server must include the environment identifier (environmentID). This, in the case the same keyId is shared among multiple environments, permits to select the correct environment.

Thus, the environment E contains specific information for technology DRM A 400, specific information for DRM technology B 402 including license properties 404,405 for each service and the verification method (e.g. plug-in reference) 406 for the service. That is, the environment E contains configuration information for more than one DRM technology. For example, DRM A could be for a PlayReady based service and DRM B could be for a Marlin service. The environment E is associated with a list of key pairs to enable the secret key to be identified from the keyId in the asset. From the logical point of view, each environment has logically associated the assets (key pairs) that can be used in that environment. In practice the full set of key pairs and the environments are stored in a separate database tables connected by a relation. The environment E is particularly advantageous in supporting OTT (over-the-top) services. In OTT services which are supplying large numbers of customers, it is very likely that the customers will have different end user devices and thus require support for different DRM technologies. If the service provider launches an OTT service for a set of customers, with varying end user devices, it is very useful if that service can be associated with an environment which supports the DRM technologies for those customers. Note that although environment E in FIG. 2 is shown supporting two DRM technologies, multiple DRM technologies (more than two) may be supported. For the majority of use cases, this environment can be naturally associated to a specific OTT service such that all license requests coming in from customers in respect of that OTT service can be handled through association with a single environment E. When an asset (encrypted according to the CENC specification) is associated to an environment, it means that the asset can be decrypted and processed by all the DRM technologies specified in that environment. The environment illustrated in FIG. 2 supports the CENC encryption where an encrypted asset can be interpreted by multiple DRM technologies.

When a new OTT service is launched, at least one environment is configured in the guard subsystem. The guard subsystem can create as many environments as are needed to serve the services. There are different possibilities of association between services and environments as discussed more fully in the following. When an environment is created for a service, an environment identifier is held in a web store which provides the service. It can either be hard coded in the web store or it can be a piece of metadata associated to content items which form part of the OTT service.

Each OTT service delivers a plurality of content items (herein referred to as assets or video assets) which form part of the particular service managed by a service provider.

Figure 5:
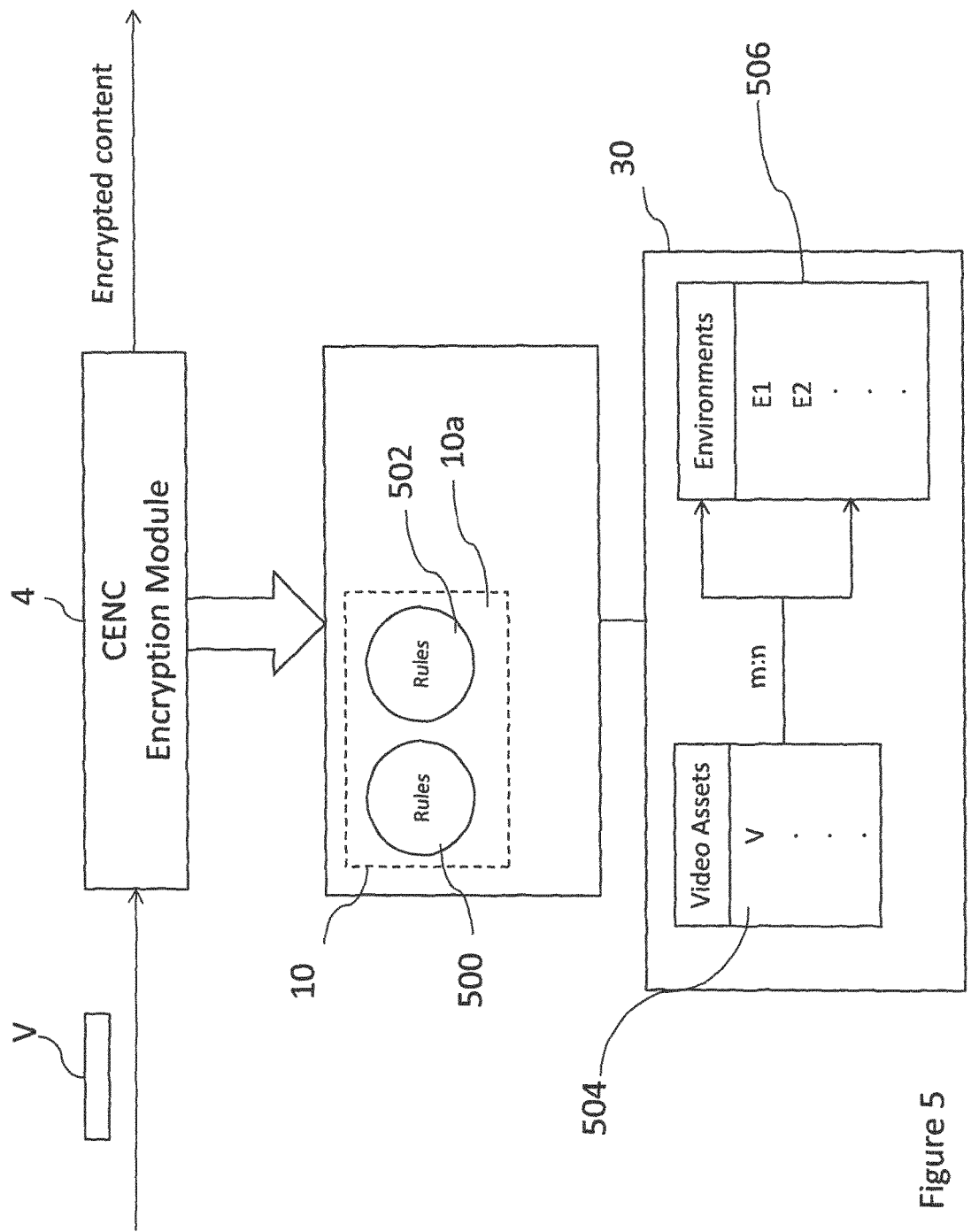
FIG. 5 is a schematic block diagram illustrating the association between services and environments.

Reference will now be made to FIG. 5 to describe how the association of a video asset V to more than one environment is permitted. When an asset V is encrypted, a set of rules 500, 502, based on naming conventions, are run by the key server module 10 to associate that asset to all the environments desired. They key server 10 has a key server API 10*a* and a key server rule engine 10*b*. In this way, it is possible to associate the same asset to multiple environments and hence to multiple OTT services. As illustrated in FIG. 5, each environment now has its own independent set of rules which can be executed by the key server 10. FIG. 5 illustrates a set of rules 500 for environment E 1, and a set of rules 502 for environment E 2. The guard user interface permits to specify these rules and define their execution order for each environment. Rules can be created using predicates such as: exact-match, contains, is-postfix, is-prefix. The rules operate based on syntactical structure of the string representing the asset ID (sometimes referred to as content ID). For instance, a rule could specify that all content identifiers starting with the string "OTT service 1" must be associated to environment E1.

As mentioned above, the asset can be associated to more than one environment, such that an asset can be associated with all the environments desired to be associated with an asset. In this way it is possible to associate the same asset to multiple environments and multiple OTT services. An example of a data structure is shown in FIG. 5. The configuration database 30 has two tables, a video asset table 504 and an environment table 506, where there is a m:n relationship between the video asset table and the environment table.

Figure 6:
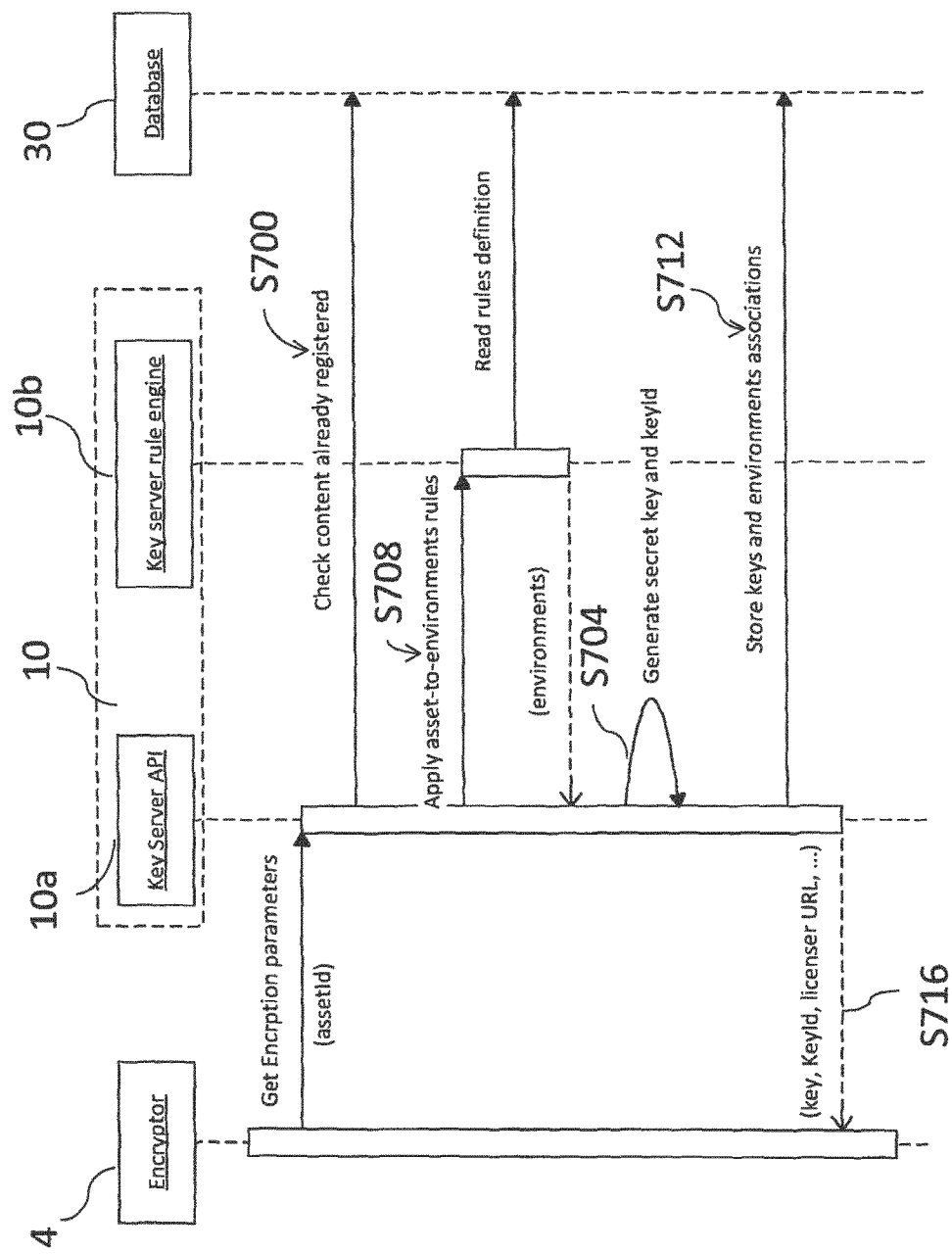
FIG. 6 is a schematic block diagram illustrating the registration of an asset into the computer system.
Figure 7:
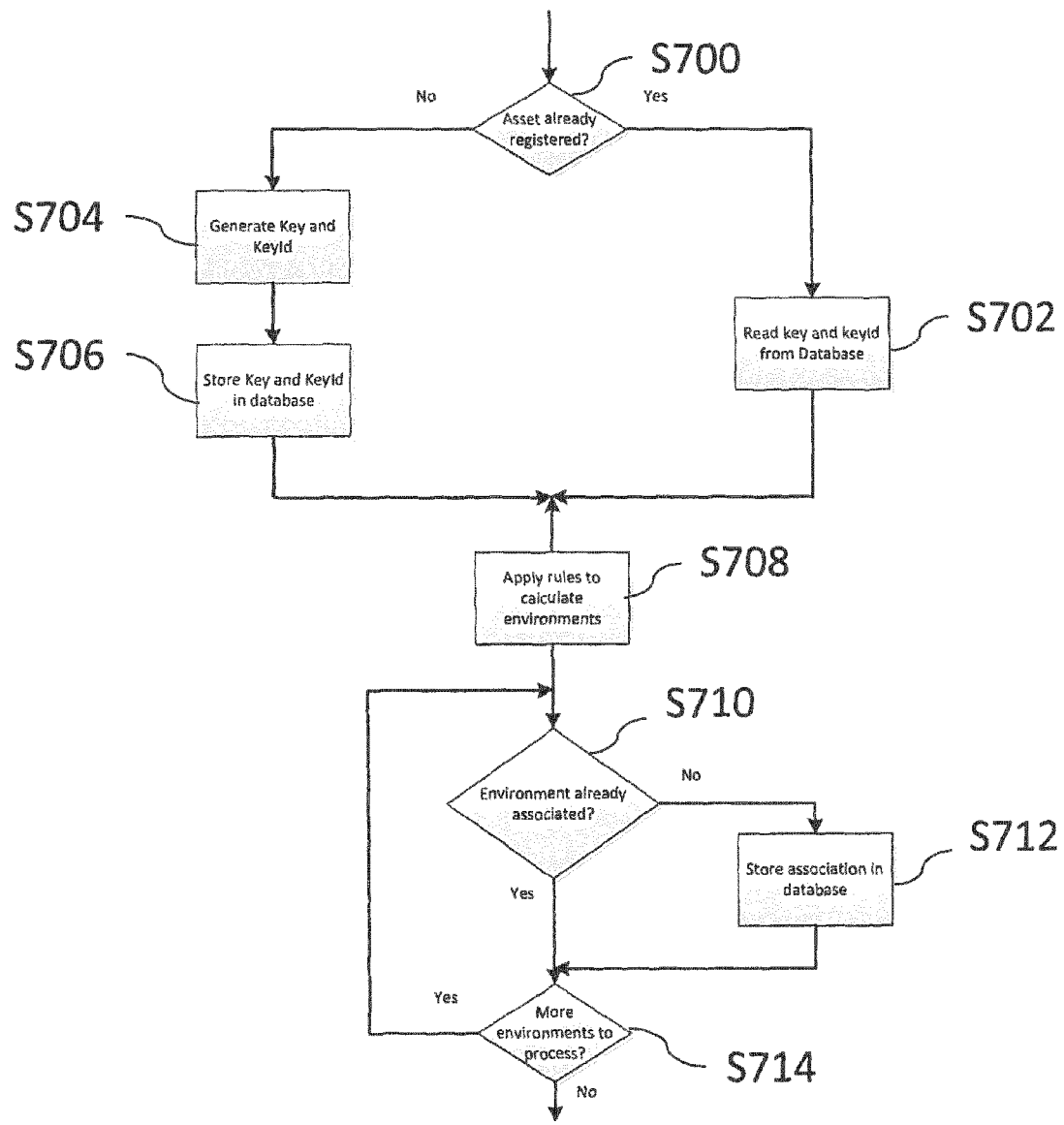
FIG. 7 is a flowchart illustrating the steps of the method of registration of an asset into the computer system.

FIGS. 6 and 7 illustrate respectively a message exchange diagram and a flow diagram illustrating how an asset is registered into the guard subsystem. The encrypter requests encryption parameters to the key server 10 for the AssetiD via the key server API. Firstly (S700) a check is made to see whether the asset has already been registered against the database 30. If the asset has already been registered, then the key (secret key) and keyId (public key) associated with the asset is read from the database 30 (S702). If the asset has not already been registered, then the key server 10 generates a secret key and keyId (S704) and stores the key and keyId in the database (S706). In the flow chart this is shown as a separate step which I have marked S706, but note that in FIG. 6, the step of storing keys is shown only with the step of storing environment associations, for ease of reference.

The key server rule engine 10b applies the asset to environment rules 500, 502 to determine the required environment. This involves a query to the database to read a rule definition from the database, and then environment IDS are returned to the key server API. At step S710, it is determined whether the environment is already associated with the asset. If it is not, then the association is stored in the database 30 (S712). If the environment is already associated, then a check at S714 is made to determine if there are more environments to process (recall that each environment has its own set of rules to be compared against the asset and the sequence is followed again until all environment associations are stored in the database 30). The dialog between the encryption module 4 and the key server 10 which has been initiated by the encrypter obtains the necessary information needed to encrypt a given asset identified by the asset ID and to populate in the encrypted asset the structures defined by CENC, for example with DRM headers. The key server API 10a returns this information, including the keyId, secret key, licensor URL, etc. that are supplied to the encrypter as step S716 shown in FIG. 6.

Figure 8:
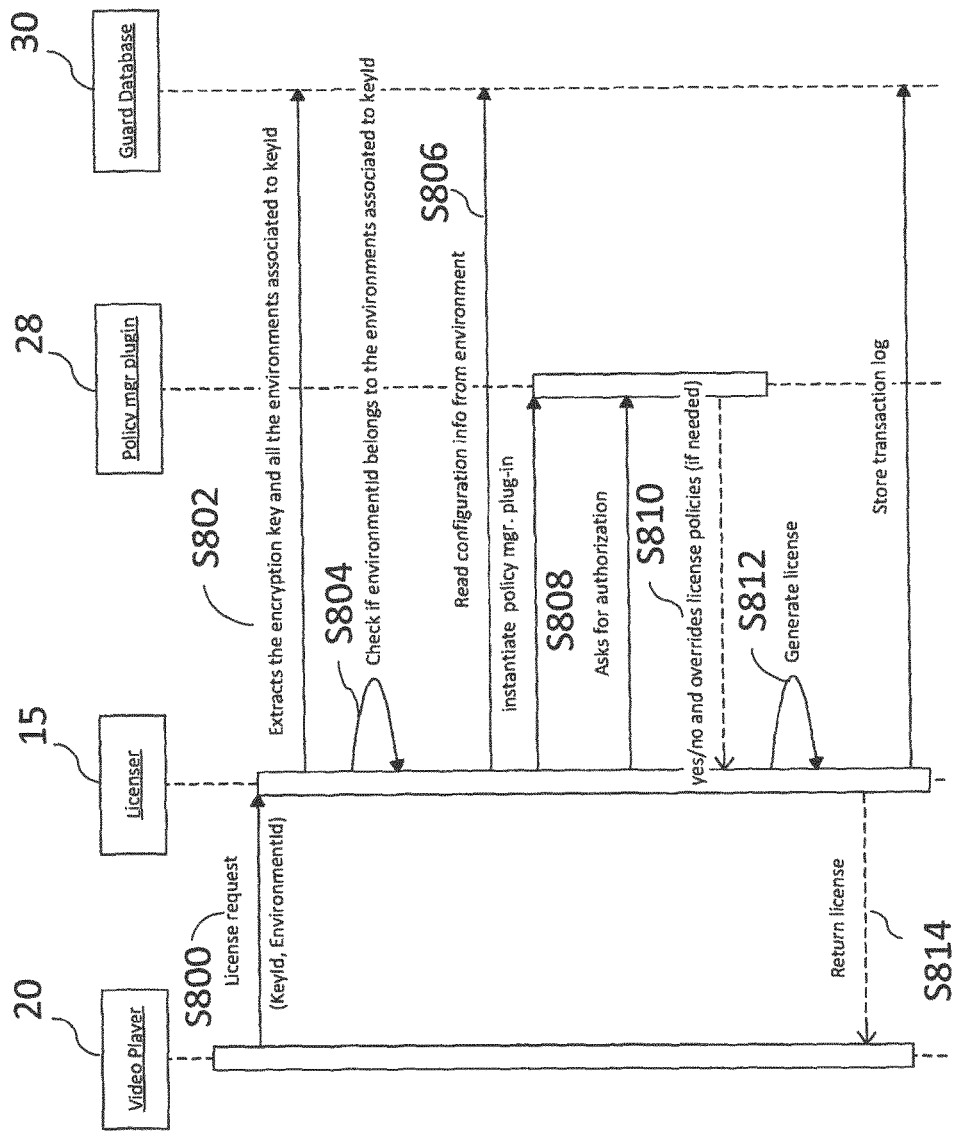
FIG. 8 is a message exchange diagram illustrating a license request.

FIG. 8 illustrates a sequence of message exchanges in handling a license request from a video player. When a video player (client 20 installed at an end user) engages the guard subsystem for requesting a DRM license using the specific DRM technology, the request contains two pieces of information: a) a key identifier keyId; and b) the environment identifier. The environment identifier is known to the web store 25. It can either be hard coded in the web store or it can be one of the metadata associated with a content similar to title, synopsis, price, etc. The two elements a) and b), plus the DRM technology being used (information that is implicit in the license request itself) is used by the guard subsystem to extract from the key store 10 all the information necessary to correctly process the request:

(i) Which key to include in the license,
(ii) which properties to associate to the license, and
(iii) which policy manager to engage to verify the user entitlement.

FIG. 8 illustrates at step S800 the license request sent from the video player to the licensor, implemented at the respective license server(s) 15. At step S802 the licensor extracts the encryption key and all the environments associated to the keyId by querying the guard database 30. At S804, a check is conducted to see if the environment ID belongs to the environments associated to the keyId. Assuming the check is satisfied then at Step S806 configuration information is read from the environment or environments associated with the asset. At step S808 the policy manager plug-in 28 defined in the environment identified by environmentID is instantiated and a request for authorisation is passed to it. The policy manager plug-in grants or refuses authorisation and overrides license properties if needed, otherwise it simply enables the licensor to generate the license at step S810 which is returned to the video at step 812.

Figure 9A:
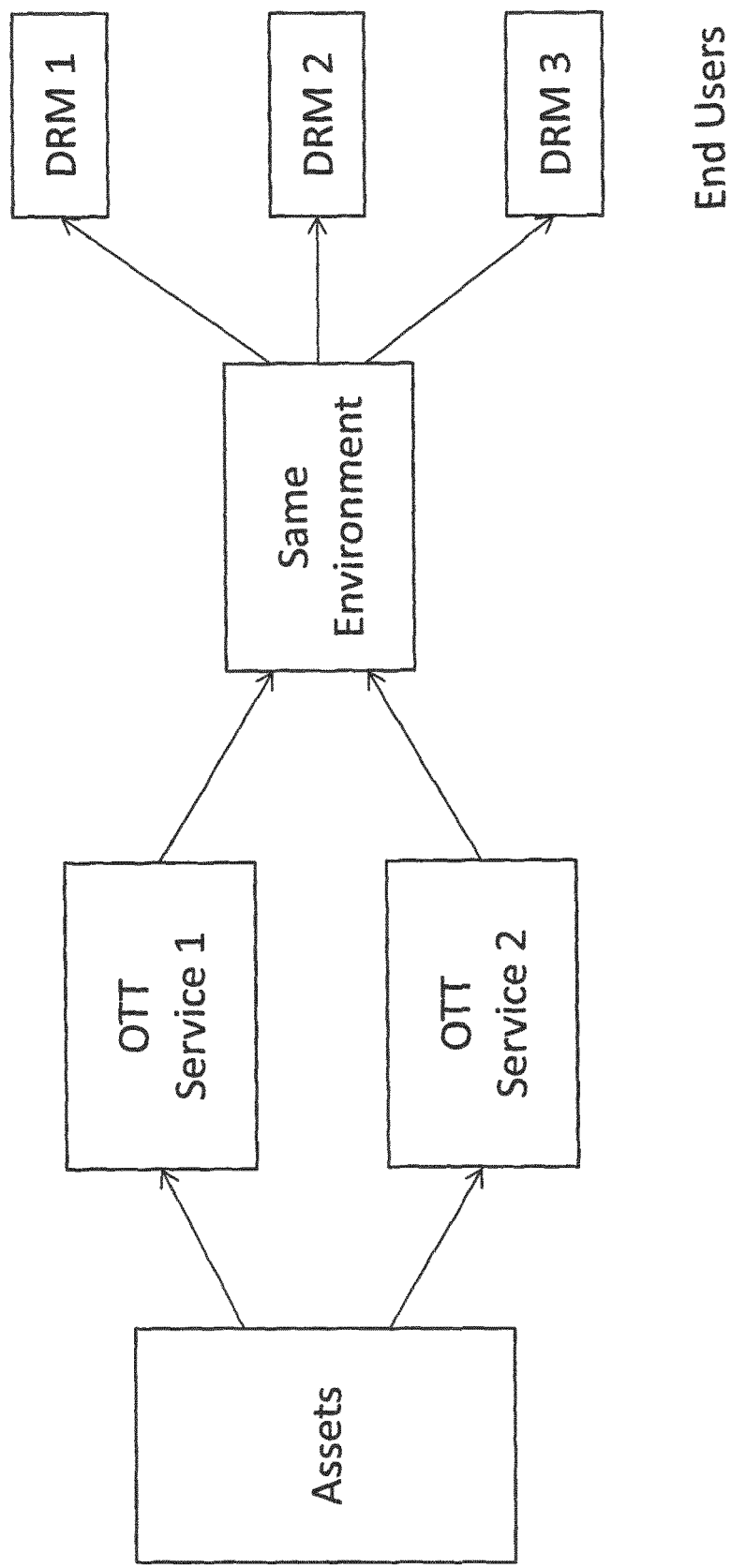
FIGS. 9a to 9c illustrate use cases.
Figure 9B:
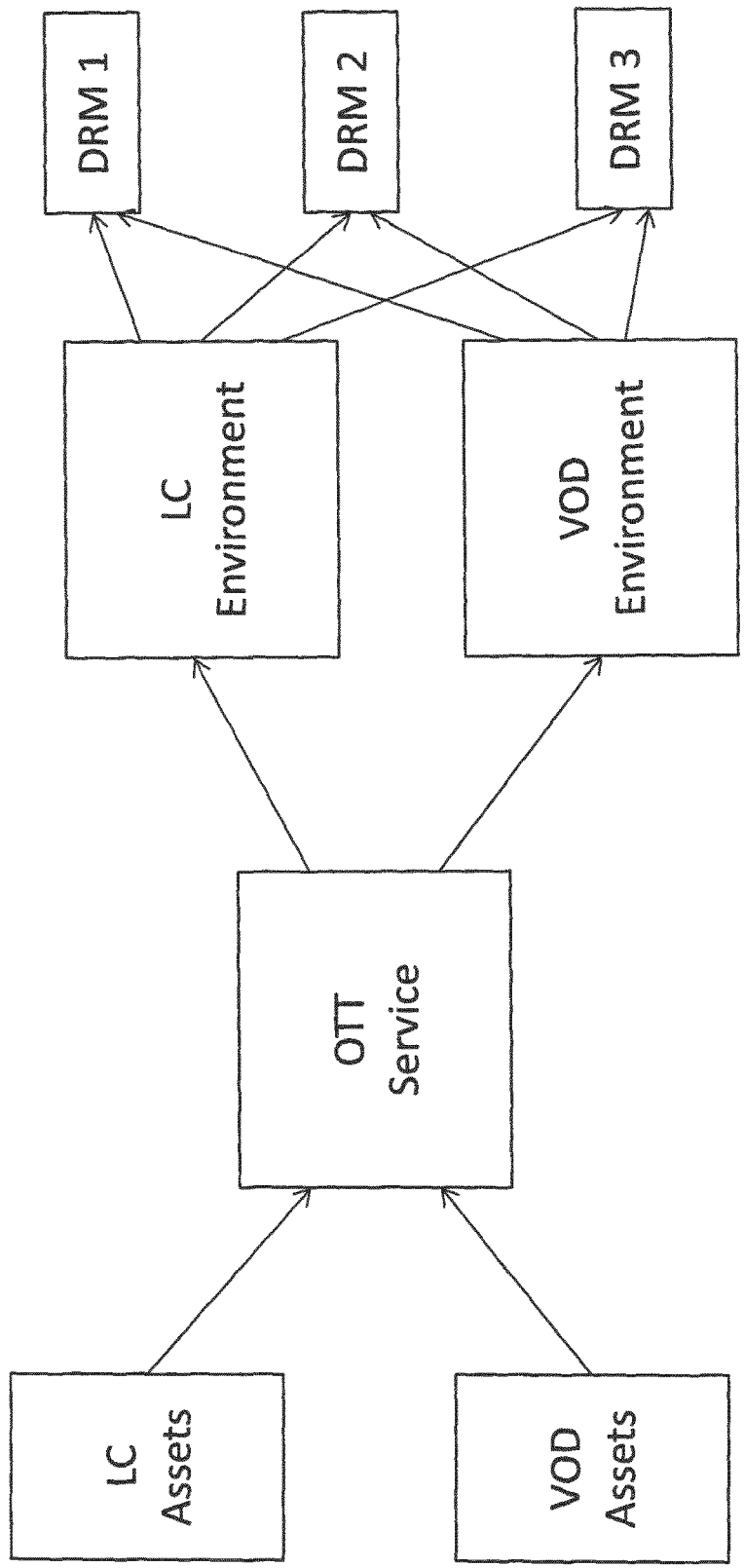
Figure 9C:
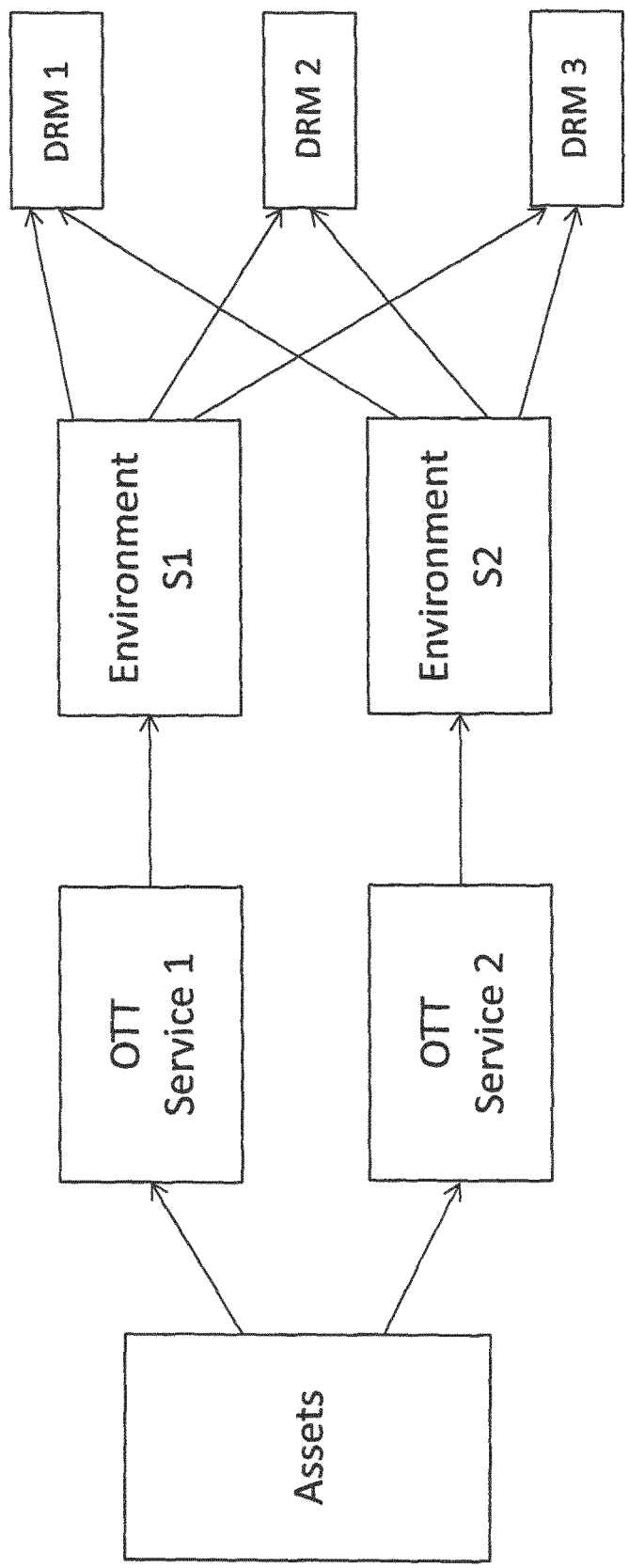

The infrastructure and methods described with reference to FIGS. 4 to 8 provide a highly flexible and efficient way of handling encrypted assets while the environments are ideally suited to provide a one-to-one association between an OTT service (possibly with multiple DRM) and an environment. It is also possible to have two OTT services as perceived by the end user sharing the same guard environment (FIG. 9a), or vice versa it is possible to have one OTT service as perceived by the end user that uses two environments (FIG. 9b). In the first case, the perception of the end user could be because for some commercial reason the OTT services are different offers although they have the same assets, license properties and verification method. An example of the second case is when the VOD assets and linear channels require different verification methods, but this is invisible to the end user who only perceives one OTT service. The implementation described herein permits all these possibilities, including the possibility to have two OTT services associated to two separate environments but sharing the same set of assets (FIG. 9c).

The invention claimed is:

1. A method of controlling delivery of encrypted assets in a service which governs delivery of assets to user devices, the method comprising;

defining a plurality of environments, each environment identifying at least one data rights management (DRM) technology;

defining a corresponding plurality of environment rules, each being specific to one of the plurality of environments, each rule defining an association of an asset to be delivered to one or more of the defined environments;

associating each asset to be delivered with the one or more environments in accordance with said rules;

storing, for each asset to be delivered, a key identifier uniquely identifying the asset and an identity of each environment associated to that asset;

providing the key identifier to an encrypter for encrypting the asset to be delivered, for inclusion in an encrypted version of the asset;

receiving a license request from a user device, the license request including a received key identifier and a received environment identifier;

identifying a stored key identifier matching to the received key identifier;

determining if the received environment identifier matches a stored identity of an environment for the stored key identifier with which it matches; and if a matched environment is determined, providing a license for the matched environment in response to the license request; and wherein when a new over-the-top (OTT) service is launched a new environment is created.

2. The method of claim 1 wherein there is further defined at least one software plug-in to be instantiated on receipt of said license request, in order to verify if delivery of the asset to the user device requesting the license is valid.

3. The method of claim 2 wherein at least one environment corresponds to an over-the-top (OTT) service, the environment supporting DRM technologies of user devices of all customers of the OTT service.

4. The method of claim 3 wherein all license requests from customers of an OTT are handled in a single environment.

5. The method of claim 1 wherein each environment identifies a plurality of DRM technologies, wherein associating an asset to an environment means the asset can be decrypted by all DRM technologies identified in that environment.

6. The method of claim 5 wherein each asset is encrypted according to a common encryption (CENC) specification.

7. The method of claim 1 wherein each rule associates an asset to an environment based on a name of the asset, each asset being associated with one or more environments according to its name.

8. The method of claim 1 wherein each asset is associated to multiple environments.

9. The method of claim 1 wherein each asset is encoded to have multiple headers, each header being associated with respective DRM technologies of the at least one environment with which the asset is associated.

10. The method of claim 1 wherein the license request identifies the DRM technology used by the user device.

11. A computer device for controlling delivery of encrypted assets in a service which governs the delivery of a set of assets to a group of user devices, the computer device comprising:
- a store, comprising one or memories, for storing a plurality of environment identifiers, each environment identifier identifying an environment, each environment identifying at least one data rights management (DRM) technology;
- a store, comprising one or memories, for storing a plurality of environment rules, each environment rule being specific to one of the plurality of environments, each rule defining an association of an asset to be delivered to one or more of the defined environments;
- a store, comprising one or memories, for storing a key identifier for each asset to be delivered, the key identifier uniquely identifying the asset and the identity of each environment associated to that asset;
- a hardware processor configured to:
map each asset identifier to one or more environments in accordance with the environment rules;
transmit the key identifier to an encrypter for encrypting the asset to be delivered, for inclusion in an encrypted version of the asset; and
- a license hardware server configured to:
receive a license request;
determine if an environment identified in the license request matches with an environment to which the key identifier in the license request is mapped;
if a match is determined, provide the license in response to the request; and
wherein when a new over-the-top (OTT) service is launched, a new environment is created.

12. The device of claim 11 wherein there is further provided at least one plug-in to be instantiated on receipt of said license request, in order to verify if delivery of the asset to the user device requesting the license is valid.

13. The device of claim 11, wherein at least one user device is associated with a plurality of environments.

14. The device of claim 11 wherein at least one environment corresponds to an over-the-top (OTT) service, the environment supporting DRM technologies of user devices of all customers of the OTT service.

15. The device of claim 14 wherein all license requests from customers of an OTT are handled in a single environment.

16. The device of claim 11 wherein each environment identifies a plurality of DRM technologies, wherein associating an asset to an environment means the asset can be decrypted by all DRM technologies identified in that environment, and wherein each asset is encrypted according to a common encryption (CENC) specification.

17. The device of claim 11 wherein each rule associates an asset to an environment based on a name of the asset, each asset being associated with one or more environments according to its name.

18. The device of claim 11 wherein each asset is encoded to have multiple headers, each header being associated with respective DRM technologies of the at least one environment with which the asset is associated.

19. The device of claim 11 wherein the license request identifies the DRM technology used by the user device.

* * * * *